United States Patent Office 2,886,575
Patented May 12, 1959

2,886,575

CYCLIC BORON COMPOUNDS

George W. Conklin, Oakland, and Rupert C. Morris, Berkeley, Calif., assignors to Shell Development Company, New York, N.Y., a corporation of Delaware No Drawing. Application December 17, 1956
Serial No. 628,544

14 Claims. (Cl. 260—243)

The present invention provides novel and useful cyclic esters of acids of trivalent boron wherein the boron atom is a member of a 5- to 6-membered ring and wherein there is directly substituted on the boron atom an amino group, and a process for their production.

The compounds of the invention can be represented by the following general structural formula:

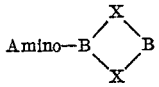

wherein X is a chalcogen having a molecular weight of from about 16 to about 32, R is a divalent hydrocarbon radical, preferably an alkylene radical, in which the valent carbon atoms are separated by up to one saturated carbon atom so as to constitute part of a ring system of 5 to 6 atoms in the ring, which rings are borolane and borinane, respectively, and "Amino" represents an amino radical, that is, the residue of ammonia or an organic amine and can be represented by the general structure —NR'R" wherein R' and R" are selected from the group consisting of the hydrogen atom and organic radicals and wherein R' and R" together can represent a divalent radical which forms with the nitrogen atom a heterocyclic ring. The amino group is preferably the residue of an amine having attached to the nitrogen atom from 1 to 2 alkyl groups or an alkylene group. By the term "borolane" is meant a saturated five-membered heterocyclic ring containing one boron atom, the remaining atoms of the ring being carbon atoms. By the term "borinane" is meant a six-membered ring of the same general kind. This nomenclature follows the rule for naming simple heterocyclic rings set forth in Section 17 of the Introduction, Patterson and Capell, "The Ring Index," American Chemical Society, Monograph No. 84, Rheinhold, 1940. The particular borolane and borinane rings contemplated by the invention are those wherein two of the ring carbon atoms have been replaced with chalcogen atoms, i.e., compounds having the structure,

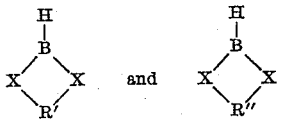

respectively, where X has a meaning previously assigned this letter; R' and R" represent divalent hydrocarbon radicals, each atom designated as X being linked to a different carbon atom of the groups R' and R", in R' the two carbon atoms so linked being adjacent carbon atoms and in R" the carbon atoms so linked being separated by one intervening saturated carbon atom.

The preferred compounds of the invention are the borolanes, and particulary the 1,3,2-dioxaborolanes, having directly substituted on the boron atom an amino group these compounds containing the structure

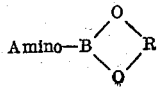

R having the meaning previously given to this letter.

The novel cyclic boron compounds of the invention are prepared by reacting a cyclic ester of an acid of trivalent boron having directly substituted on the ring boron atom of an atom of a heavy halogen element, i.e., a halogen atom other than a fluorine atom and having an atomic number of at least 17 such as a chlorine or a bromine or an iodine atom, with any amino compound having attached to the nitrogen atom from 1 to 3 hydrogen atoms, that is, ammonia or a primary or secondary amine, at a relatively low temperature, for example, below about 25° C. Preferably the reaction is carried out at a temperature between about −15° C. and 0° C. The amino compound can be represented by the general formula HNR'R" wherein R' and R" have the same meanings as above. The reaction is advantageously carried out in the presence of an inert solvent, for example, ether, dioxane, and the like.

Suitable amines which can be employed in the preparation of the novel compounds of the invention by the above-described method include, for example, the aliphatic primary amines such as methylamine, ethylamine, propylamine, butylamine, amylamine, n-octylamine, ethylene diamines, 2-ethylhexylamine, t-butylamine, 1,1,2-trimethylpropylamine, 1,3-dimethylbutylamine, 4-methylpentylamine, 3,3,5-trimethylhexylamine, cetylamine, tetradecylamine, hexadecylamine, 2,2,4-trimethylpentylamine, 2,2,4,4,6-pentamethylheptylamine, dodecylamine, octadecylamine, and higher alkyl primary amines containing up to 20 or more carbon atoms; alicyclic amines such as cyclohexylamine, 3,3,5-trimethylcyclohexylamine, cyclopentylamine, 4-phenylcyclohexylamine, methylcyclohexylamines, and homologs and analogs thereof; and aromatic amines such as aniline, naphthylamine, p-phenylenediamine, 3,5-dimethylaniline, 2,3,6-triethylaniline, phenanthrylamines, mixed coal tar bases, and homologous and analogous mono- and polycyclic aromatics; and also unsaturated primary amines such as allylamine, propargylamine, methallylamine, cyclohexenylamine, oleylamine, linoleylamine, and homologs and analogs thereof, and polyamines, such as diethylenetriamine, trimethylenediamine, diaminobenzene, and diacetonediamine. Secondary amines which are suitable include, for example, the dialkyl and substituted dialkyl amines, such as dimethylamine, diethylamine, diisopropylamine, dibutylamine, N-methylbutylamine, diamylamine, dihexylamine, di-2-ethylhexylamine, dioctylamine, bis(2,2,4-trimethylphentyl)amine, bis(3,5,5-trimethylhexyl)amine, N-ethylcetylamine, didodecylamine, ditetradecylamine, N-isopropylstearylamine, N-butylricinoleylamine, N-isoamylhexylamine, N-ethyloctylamine, dioctadecylamine, and their homologs and analogs; the secondary cycloalkyl amines, such as dicyclohexylamine, N-methylcyclohexylamine, dicyclopentylamine, N-octylcyclohexylamine, N-octyl-3,5,5-trimethylcyclohexylamine, and their homologs and analogs; the secondary aromatic amines, such as N-methylaniline, diphenylamine, dibenzylamine, N-octylbenzylamine, N-octylphenylamine, N-butyl-p-methoxyaniline, N-cyclohexylaniline, N-2-ethylhexylaniline, N-octylbiphenylamine, dinaphthylamine, diphenanthrylamine and their homologs and analogs; and unsaturated secondary amines, such as diallylamine, N-ethylallylamine, N-octylallylamine, di-oleylamine, N-isopropyloleylamine, N-methyl-3,3,5-trimethyl-5-cyclohexenylamine, N-amyl linoleylamine, N-phenylallylamine, N-methylpropargylamine, N-(p-chlorobenzyl)-allylamine, and their homologs and analogs. Heterocyclic amines, such as pyrrole, pyrrolidine, piperidine, 2,2,4,6-tetramethylpiperidine, morpholine, thiamorpholine, 2-aminopyrimidine, 2-aminopyridine, pyrazole, imidazole and the like can also be used. The preferred amines are those having directly attached to the nitrogen atom from 1 to 2 alkyl groups or an alkylene group, which alkyl or alkylene group contain from 1 to 20 carbon atoms, particularly from 1 to 10 carbon atoms.

The above reaction is generally carried out in the presence of a hydrogen halide acceptor which is usually an amine which will form with the hydrogen halide a salt which is insoluble in the reaction mixture. The amine which is employed as the starting material for the preparation of the present cyclic boron compounds will generally function also as hydrogen halide acceptor, and, therefore, the reaction is generally carried out with at least two molar equivalents of amine per equivalent of the halo-substituted cyclic boron compound.

When ammonia or a primary amine is employed in the above reaction, polyborolanyl amines and polyborinanyl amines can be obtained as well as the mono derivatives, depending upon the relative proportions of the reactants used. These polyboranyl and polyborinanyl amines are represented by the formula

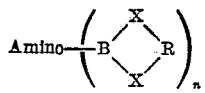

wherein "Amino," "X" and "R" each have the respective meaning hereinbefore set out and "$n$" represents either of the integers, 2 or 3. The use of a large molar excess of ammonia or primary amine will favor the formation of the monoborolanyl and monoborinanyl amines.

The halo-substituted cyclic boron compounds which constitute the starting materials in the above-described reaction are prepared by reacting a boron trihalide, such as boron trichloride or boron tribromide, with a dihydric alcohol in which the hydroxy radicals are attached to carbon atoms which are separated from each other by up to one carbon atom. The reaction is generally carried out at a temperature within the range of from about $-10°$ C. to about $100°$ C. and in the presence of an inert solvent. Suitable solvents include halogenated hydrocarbons such as methylene chloride, methylene bromide, ethylene chloride, ethylene bromide, and the like.

Representative dihydric alcohols which can be employed include: ethylene glycol, 1,2-propanediol, propylene glycol, 1,2-butanediol, 1,3-butanediol, 2-methyl-1,3-butanediol, 2-ethyl-1,3,-butanediol, 1,2-pentanediol, 1,3-pentanediol, 2-methyl-1,3-pentanediol, 2,3-butanediol, 2,4-pentanediol, 2,3-pentanediol, 2-ethyl-1,3-pentanediol, 1,2-hexanediols, 1,3-hexanediols, 1,2-heptanediols, 1,3-heptanediols, and the like. The corresponding hydroxymercaptans and dithiols can be employed for the preparation of monothio cyclic esters and dithio cyclic esters, respectively. The preferred diols are the alkylene glycols having from about 2 to about 20 carbon atoms.

Representative examples of the present novel cyclic boron compounds include the following:

2-dimethylamino-1,3,2-dioxaborolane
2-dimethylamino-4-methyl-1,3,2-dioxaborolane
2-methylamino-1,3,2-dioxaborolane
2-methylamino-4-methyl-1,3,2-dioxaborolane
N-methyl bis-2(1,3,2-dioxaborolanyl)amine
2-diisopropylamine-1,3,2-dioxaborolane
2-diisopropylamine-4-ethyl-1,3,2-dioxaborolane
2-(N-methyl-N-butylamino)-4-methyl-1,3,2-dioxaborolane
2-anilino-1,3,2-dioxaborolane
2-(N-methylanilino)-1,3,2-dioxaborolane
2-cyclohexylamino-5-propyl-1,3,2-dioxaborolane
2-(N-cyclohexyl-N-ethylamino)-1,3,2-dioxaborolane
2-dicyclohexylamino-4-methyl-1,3,2-dioxaborolane
2-dicyclopentylamino-1,3,2-dioxaborolane
2-dimethylamino-1-oxa-3-thia-2-borolane
Tris-2(1,3,2-dioxaborolanyl)amine
N-phenyl bis-2(1,3,2-dioxaborolanyl)amine
2-piperidino-1,3,2-dioxaborolane
2-methylpiperidino-1,3,2-dioxaborolane
2-pyrrolidino-5-isopropyl-1,3,2-dioxaborolane
2-pyrrolidino-1,3,2-dioxaborolane
2-morpholino-1,3,2-dioxaborolane
2-diethylamino-1,3,2-dioxaborinane
2-(N-ethyl-N-tert.-butylamino)-5-ethyl-1,3,2-dioxaborinane
2-diamylamino-1,3,2-dioxaborinane
2-bis(2-ethylhexyl)amino-1,3,2-dioxaborinane
2-naphthylamino-4-butyl-dioxaborinane
2-(N-cyclohexylanilino)1,3,2-dioxaborinane
2-diphenylamino-4-methyl-1,3,2-dioxaborinane
2-dicyclohexylamino-1,3,2-dioxaborinane
2-methylamino-1-oxa-3-thia-2-borinane
Tris-2(4-methyl-1,3,2-dioxaborinanyl)amine
2-piperidino-4-ethyl-dioxaborinane
2-pyrrolidino-1,3,2-dioxaborinane
2-thiamorpholino-5-ethyl-1,3,2-dioxaborinane as well as the corresponding monothio and dithio derivatives.

The following examples serve to illustrate the novel compounds of the present invention and their preparation. It will be appreciated that the following examples are presented with the intent to illustrate rather than to limit the invention as it is defined in the hereto appended claims.

*Example I.—2-dimethylamino-1,3,2-dioxaborolane*

430 parts by weight (3.67 moles) of boron trichloride in 901 parts by weight of methylene chloride were stirred in a 4-necked flask equipped with thermometer, dropping funnel and $CO_2$-cooled condenser in addition to the stirrer. 170 parts by weight (2.75 moles) of ethylene glycol were added slowly over a period of 80 minutes while the temperature of the refluxing solution rose from $12°$ to $21°$ C. The stirred solution was then purged of hydrogen chloride by a gentle flow of nitrogen over the surface for a period of 37 minutes. Heat was applied to maintain the temperature at $20°$ C. The solution was then stabilized to $73°$ C. under a pressure of about 200 mm. Hg to yield 387 parts by weight of bottoms product which was distilled to obtain 2-chloro-1,3,2-dioxaborolane.

100 parts by weight (0.94 mole) of 2-chloro-1,3,2-dioxaborolane in 102 parts by weight of ether were added with stirring and over a period of 18 minutes to 85 parts by weight (1.89 moles) of dimethylamine in 345 parts by weight of ether in a 4-necked flask equipped with a thermometer, $CO_2$-cooled condenser and dropping funnel in addition to the stirrer, at a temperature of $-5°$ to $-10°$ C. The mixture was stirred for 3.5 hours longer while being allowed to warm to $22°$ C. Dimethylamine hydrochloride was filtered off and washed with ether. The filtrate and washings were stabilized to $65°$ C. under a pressure of about 250 mm. Hg to leave 122 parts by weight of bottoms product. The bottoms product was distilled, and the distillate boiling at $55°$ to $62°$ C. at 60 mm. Hg was recovered as product. Analysis: Found 12.2% nitrogen and 9.3% boron; Calculated, 12.2% nitrogen and 9.4% boron.

*Example II.—2-dimethylamino-4-methyl-1,3,2-dioxaborolane*

A solution of 889 parts by weight (7.57 moles) of boron trichloride in 1900 parts by weight of methylene chloride was cooled to $-10°$ C. and placed in a 4-necked flask equipped with a stirrer, thermometer, dropping funnel and $CO_2$-cooled condenser. To the solution was added 456 parts by weight (6 moles) of propylene glycol over a period of 84 minutes. The temperature slowly rose to $22°$ C. during the course of the glycol addition. The temperature was maintained by HCl evaporation and reflux of the solution. After the glycol addition was complete, nitrogen was swept over the surface of the solution for 35 minutes to remove HCl. Heating was applied to maintain the temperature at $20°$ to $23°$ C. The solution was stabilized by heating up to about $50°$ C. under a pressure of about 250 mm. Hg. The stabilized material was Claisen distilled to yield as product 4-methyl-2-chloro-1,3,2-dioxaborolane.

A solution of 117 parts by weight (0.97 mole) of 4-methyl-2-chloro-1,3,2-dioxaborolane in 100 parts by weight of ether was added over a period of 12 minutes to a solution of 87 parts by weight (1.97 moles) of dimethylamine in 298 parts by weight of ether in a 3-necked flask equipped with a $CO_2$-cooled condenser, thermometer, dropping funnel and stirrer. The reaction temperature was maintained between $-3°$ C. and $-16°$ C. (between $-6°$ C. and $-8°$ C. during the greater part of the addition). The mixture was stirred 2.5 hours longer while the temperature was allowed to rise to 23° C. Dimethylamine hydrochloride was filtered off and washed with ether. The filtrate and washings were stabilized to 50° C. at about 250 mm. Hg pressure to obtain 122 parts by weight of bottoms product. The bottoms product was distilled, and the distillate boiling at 45° C. at 20 mm. Hg pressure was recovered as product. Analysis: Found, 9.5% hydrogen, 46.6% carbon, 10.6% nitrogen and 7.9% boron. Calculated: 9.3% hydrogen, 46.5% carbon, 10.9% nitrogen and 8.4% boron.

*Example III.—2-methylamino-4-methyl-1,3,2-dioxaborolane*

One thousand thirty-five parts by weight of a solution of 1.75 moles of 2-chloro-4-methyl-1,3,2-dioxaborolane in ether and methylene chloride were added with stirring and over a period of 85 minutes to 429 parts by weight (13.8 moles) of methylamine dissolved in 454 parts by weight of ether in a vessel equipped with stirrer, thermometer, dropping funnel, $CO_2$-cooled condenser and external cooling. The temperature was kept at $-8°$ to $-10°$ C. by cooling during the addition. The mixture was stirred 78 minutes longer while it was allowed to warm to 12° C. The mixture separated into two layers which were separated. The upper layer was stabilized to 31° C. at a pressure of about 250 mm. Hg. The stabilized material was Claisen distilled, and the distillate boiling at 38° C. at about 10 mm. Hg pressure was recovered as product. Analysis: Found, 8.9% hydrogen, 41.9% carbon, 11.9% nitrogen and 9.5% boron. Calculated, 8.71% hydrogen, 41.8% carbon, 12.2% nitrogen and 9.4% boron.

*Example IV.—2-pyrrolidyl-4-methyl-1,3,2-dioxaborolane*

A solution of 91 parts by weight (0.70 mole) of 2-chloro-4-methyl-1,3,2-dioxaborolane in 191 parts by weight of ether was added with stirring and over a period of 32 minutes to 107 parts by weight (1.5 moles) of pyrrolidine in 502 parts by weight of ether in a vessel equipped with stirrer, dropping funnel, thermometer, $CO_2$-cooled condenser and external cooling bath. The temperature was $-7°$ C. to $-11°$ C. during the addition. Pyrrolidine hydrochloride was filtered off and washed with ether. The filtrate and washings were stabilized to about 40° C. at 5 to 10 mm. Hg pressure to obtain 85 parts by weight of a bottoms product. The bottoms product was distilled to recover 2-pyrrolidyl-4-methyl-1,3,2-dioxaborolane.

*Example V.—2-(N-methylanilino)-1,3,2-dioxaborolane*

2-chloro-1,3,2-dioxaborolane dissolved in ether was added with stirring and over a period of one hour to two molar equivalents of N-methylaniline dissolved in ether in a vessel equipped with stirrer, dropping funnel, thermometer, $CO_2$-cooled condenser and external cooling bath. The temperature was maintained at $-5°$ to $-10°$ C. during the addition. N-methylaniline hydrochloride was filtered off and washed with ether. The filtrate and washings were stabilized and the stabilized product was distilled to recover 2-(N-methylanilino)-1,3,2-dioxaborolane.

*Example VI.—2-diisopropylamino-1,3,2-dioxaborinane*

2-chloro-1,3,2-dioxaborinane, obtained by the reaction of boron trichloride and 1,3-propanediol, was dissolved in ether and added with stirring and over a period of 1.5 hours to two molar equivalents of diisopropylamine dissolved in ether in a vessel equipped with stirrer, dropping funnel, thermometer and $CO_2$-cooled condenser. The temperature was maintained at $-5°$ to $-10°$ C. The mixture was stirred 1.5 hours longer during which it warmed to 20° C. Diisopropylamine hydrochloride was filtered off and washed with ether. The filtrate and washings were stabilized and the stabilized product was distilled to recover as product 2-diisopropylamino-1,3,2-dioxaborinane.

*Example VII.—2-dicyclohexylamino-4-methyl-1,3,2-dioxaborinane*

2-chloro-4-methyl-1,3,2-dioxaborinane, obtained by the reaction of boron trichloride and 1,3-butanediol, was dissolved in ether and added with stirring and over a period of one hour to two molar equivalents of dicyclohexylamine in ether in a vessel equipped with stirrer, dropping funnel, thermometer and $CO_2$-cooled condenser. The temperature was $-6°$ to $-11°$ C. during the addition. The mixture was stirred for two hours longer during which it warmed to 20° C. Dicyclohexylamine hydrochloride was filtered off and washed with ether. The filtrate and washings were stabilized and the stabilized product was distilled to recover as product 2-dicyclohexylamino-4-methyl-1,3,2-dioxaborinane.

*Example VIII.—2-dimethylamino-1,3,2-dithiaborolane*

2-chloro-1,3,2-dithiaborolane, obtained by the reaction of boron trichloride and ethanedithiol, was dissolved in ether and added with stirring and over a period of 1.5 hours to two molar equivalents of dimethylamine in ether in a vessel equipped with stirrer, dropping funnel, thermometer and $CO_2$-cooled condenser. The temperature was maintained at $-5°$ to $-10°$ C. during the addition. The mixture was stirred for two hours longer during which it warmed to 25° C. Dimethylamine hydrochloride was filtered off and washed with ether. The filtrate and washings were stabilized and the stabilized product was distilled to recover as product 2-dimethylamino-1,3,2-dithiaborolane.

The novel compounds of this invention are useful as additives to fuel compositions, particularly gasoline compositions, for use in spark-ignited internal combustion motors, especially high compression automobile and airplane motors. In such fuel compositions, the added novel compounds act to reduce the effect of deposits in the combustion chambers of motors in which the fuel compositions are used which lead to increased fuel octane number requirement, and to abnormal ignition of the fuel (preignition, autoignition, wild ping, rumble, etc.). One or more of the compounds of the invention may be used as the sole additive in a given fuel composition, or the fuel composition may contain other conventional additives, including known oxidation inhibitors, such as 2,6-ditertiary butyl-4-methyl phenol and N,N-disecondary butyl-p-phenylene diamine, tetraethyl lead as antiknock agent, scavengers, such as ethylene dibromide, and the like. The fuel compositions containing one or more of the new compounds are conveniently and effectively prepared by merely dissolving the additive compound(s) in the fuel. The concentration of the added compound(s) which ordinarily is effective for the desired purposes is that which provides at least about 0.05 gram of boron per U.S. gallon of fuel composition. However, in many cases, some benefits are realized when the amount of additive provides but 0.005 gram of boron per U.S. gallon. It is normally undesirable that more than about 1.0 gram of boron per gallon of fuel be added via the additive. A preferred concentration of additive is that which supplies from about 0.2 gram to about 0.4 gram of boron per U.S. gallon of fuel.

This application is a continuation-in-part of our copending application Serial No. 418,755, filed March 25, 1954, now abandoned.

We claim as our invention:

1. A cyclic ester of an acid of trivalent boron, wherein the boron atom is directly linked to an amino group, said ester having the structure represented by the formula

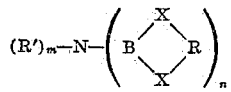

wherein the R primes represent members of the group consisting of hydrogen, hydrocarbyl groups of from 1 to 20 carbon atoms

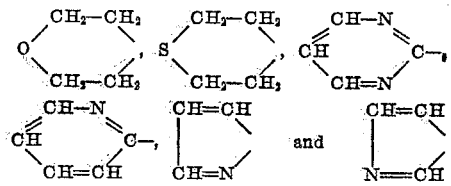

$m$ is an integer of from 0 to 2, $n$ is an integer of from 1 to 3 and $m+n=3$, X represents a member of the group consisting of the oxygen and the sulfur atoms and R represents a divalent saturated hydrocarbon radical, with the proviso that each of the atoms designated X is linked to a different carbon atom of the group R, the said two carbon atoms so linked being separated by up to one carbon atom.

2. An ester as defined in claim 1 wherein $n$ is 1, and wherein the two carbon atoms of the group R linked to the atoms designated X are separated by one intervening carbon atom.

3. An ester as defined in claim 1 wherein $n$ is 1, and wherein the two carbon atoms of the group R linked to the atoms designated X are adjacent carbon atoms.

4. A cyclic ester of an acid of trivalent boron, wherein the boron atom is directly linked to an amino group, said ester having the structure represented by the formula

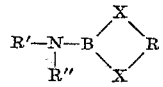

wherein R′ and R″ each represents an alkyl group, X represents a member of the group consisting of the oxygen and sulfur atoms and R represents a divalent saturated hydrocarbon radical, with the proviso that each of the atoms designated X is linked to a different carbon atom of the group R, the said two carbon atoms so linked being separated by up to one carbon atom.

5. A cyclic ester of an acid of trivalent boron, wherein the boron atom is directly linked to an amino group, said ester having the structure represented by the formula

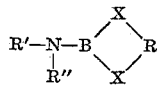

wherein R′ and R″ each represents a hydrogen atom, X represents a member of the group consisting of the oxygen and sulfur atoms and R represents a divalent saturated hydrocarbon radical, with the proviso that each of the atoms designated X is linked to a different carbon atom of the group R, the said two carbon atoms so linked being separated by up to one carbon atom.

6. A 1,3,2-dioxaborolane having directly substituted on the boron atom an amino group having directly attached to the nitrogen atom from 1 to 2 alkyl groups.

7. A 1,3,2-dioxaborolane having directly substituted on the boron atom an amino group having directly attached to the nitrogen atom by both of its free valences an alkylene group.

8. 2-dimethylamino-1,3,2-dioxaborolane.
9. 2-dimethylamino-4-methyl-1,3,2-dioxaborolane.
10. 2-methylamino-4-methyl-1,3,2-dioxaborolane.
11. 2-pyrrolidyl-4-methyl-1,3,2-dioxaborolane.

12. The process for the preparation of a cyclic ester of an acid of trivalent boron wherein the boron atom is a member of a ring and wherein there is directly substituted on the boron atom an amino group, said process comprising reacting a cyclic ester of an acid of trivalent boron having the structure represented by the formula

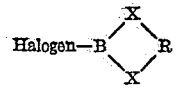

wherein the halogen atom is an atom of a halogen element having an atomic number of at least 17, X represents a member of the group consisting of the oxygen and the sulfur atoms and R represents a divalent saturated hydrocarbon radical, with the proviso that each of the atoms designated X is linked to a different carbon atom of the group R, the two carbon atoms so linked being separated by up to one carbon atom, with an amino compound of the formula HNR′R″, wherein R′ and R″ each represents a member of the group consisting of hydrogen and hydrocarbon groups of from 1 to 20 carbon atoms, with the proviso that R′ and R″ together can represent an alkylene group, which together with the indicated amino nitrogen forms a hetero ring.

13. A process for the preparation of a 1,3,2-dioxaborolane having directly substituted on the boron atom an amino group which comprises reacting a 2-halo-1,3,2-dioxaborolane in which the halogen atom is an atom of a halogen element having an atomic number of at least 17 with an amino compound of the formula HNR′R″ wherein R′ and R″ each represents a member of the group consisting of hydrogen and hydrocarbon groups of from 1 to 20 carbon atoms, with the proviso that R′ and R″ together can represent an alkylene group, which together with the indicated amino nitrogen atom forms a hetero ring.

14. A process for the preparation of a 1,3,2-dioxaborinane having directly substituted on the boron atom an amino group which comprises reacting a 1,3,2-dioxaborinane having directly substituted on the boron atom an atom of a halogen element having an atomic number of at least 17 with an amino compound of the formula HNR′R″ wherein R′ and R″ each represents a member of the group consisting of hydrogen and hydrocarbon groups of from 1 to 20 carbon atoms, with the proviso that R′ and R″ together can represent an alkylene group, which together with the indicated amino nitrogen atom forms a hetero ring.

No references cited.